(12) United States Patent
Klemp-Hawig et al.

(10) Patent No.: US 10,234,015 B1
(45) Date of Patent: Mar. 19, 2019

(54) WROUGHT STRUCTURAL COMPONENT FOR A MARINE OUTBOARD ENGINE

(71) Applicant: Brunswick Corporation, Lake Forest, IL (US)

(72) Inventors: Joseph J. Klemp-Hawig, Oshkosh, WI (US); Kevin R. Anderson, Fond du Lac, WI (US); Robert D. Cooper, III, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 211 days.

(21) Appl. No.: 15/384,789

(22) Filed: Dec. 20, 2016

(51) Int. Cl.
| | | |
|---|---|---|
| *B63H 20/32* | (2006.01) | |
| *F16H 57/032* | (2012.01) | |
| *F16H 57/021* | (2012.01) | |
| *C22C 21/02* | (2006.01) | |
| *F16H 57/02* | (2012.01) | |

(52) U.S. Cl.
CPC .......... *F16H 57/032* (2013.01); *B63H 20/32* (2013.01); *C22C 21/02* (2013.01); *F16H 57/021* (2013.01); *C22C 2202/00* (2013.01); *F16H 2057/02043* (2013.01)

(58) Field of Classification Search
CPC ................. F16H 57/032; F16H 57/021; F16H 2057/02043; B63H 20/32; C22C 21/02; C22C 2202/00

USPC ....................................................... 440/76–78
See application file for complete search history.

(56) References Cited

U.S. PATENT DOCUMENTS

| | | | |
|---|---|---|---|
| 4,747,795 A | 5/1988 | Kawamura et al. | |
| 7,008,279 B2* | 3/2006 | Ide | B63H 20/14 |
| 8,695,565 B2* | 4/2014 | Wright | F01C 1/22 |
| 9,296,459 B2* | 3/2016 | Saruwatari | B63H 20/14 |
| 2017/0033497 A1* | 2/2017 | Germani | H01R 13/5025 |

OTHER PUBLICATIONS

J. Gilbert Kaufman, 2000, "Understanding Wrought and Cast Aluminum Alloys Designations" in Introduction to Aluminum Alloys and Tempers, ASM International, p. 23-37, Year: 2000.

* cited by examiner

*Primary Examiner* — Greg Binda
(74) *Attorney, Agent, or Firm* — Andrus Intellectual Property Law, LLP

(57) ABSTRACT

Wrought structural components, including drive shaft housing components for marine outboard engines are disclosed. The components have a first face, a second face substantially parallel with respect to the first face, and a sidewall. The sidewall includes a first sidewall and a second sidewall each extending from the first face to the second face. The wrought structural components are constructed of a wrought aluminum alloy and are essentially free of draft angles. The alloys may have low silicon content, low copper content, high plane strain fracture toughness, high tensile ductility, and/or a low porosity. The wrought structural components may be prepared by extrusion.

20 Claims, 4 Drawing Sheets

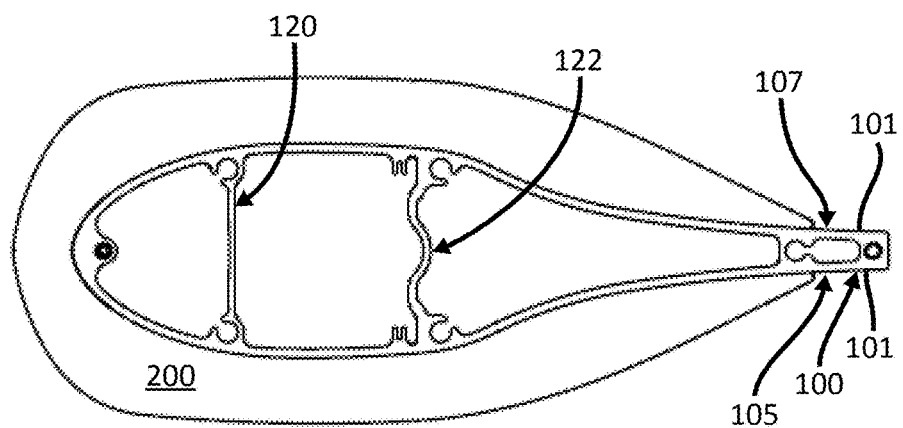
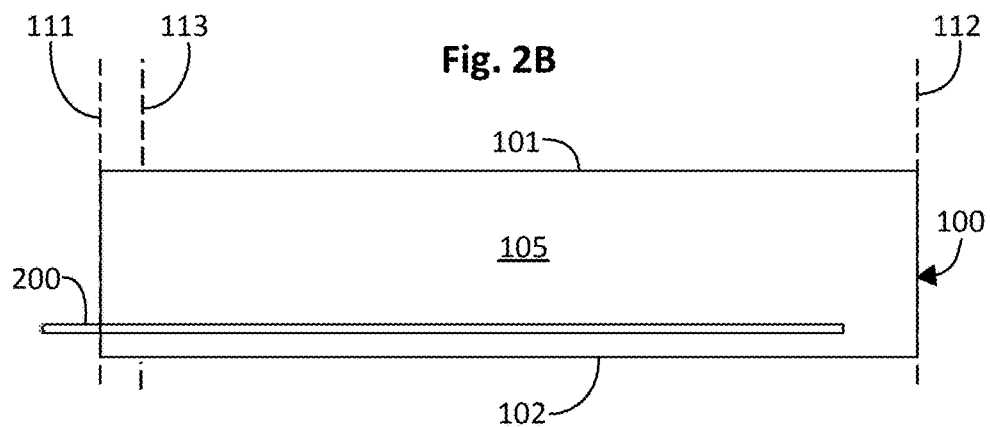

WROUGHT STRUCTURAL COMPONENT FOR A MARINE OUTBOARD ENGINE

FIELD OF INVENTION

The invention generally relates to wrought structural components for marine outboard engines. More particularly, the invention relates to wrought structural components, including driveshaft spacers, comprising a wrought aluminum alloy and essentially free of draft angles.

BACKGROUND

Structural components for marine outboard engines, including driveshaft spacers, have historically been cast using high-pressure die casting or sand casting. These casting processes result in a number of deficiencies when preparing structural components for marine outboard engines.

Casting introduces excessive weight. Casting requires the use of draft angles so that the component may be extracted from the die following casting. As a result, components comprising draft angles incorporate an excess of metal that, in turn, incorporates unnecessary weight into the component.

Cast components are prone to cosmetic defects. Cast components have high porosity and/or are covered in die lubricants, either of which may lead to subsequent cosmetic defects in the final part. To ameliorate cosmetic defects, cast components may also be de-gated or ground on coarse sanding belts to remove some or all or the as-cast surface. Post-casting processing, however, requires additional steps and injects increased cost into the manufacturing process as well as creating additional cosmetic issues.

Cast components also generally have a limited ability to absorb impact energy. Even the best cast aluminum alloys have decreased tensile ductility compared to a wrought alloy. As a result, the components prepared by casting have limited ability to absorb impact energy. Further exacerbating this problem is that the incorporation of design features intended to deform to mitigate impact events are minimally effective because of low tensile ductility of cast alloys.

Protective barrier coatings are difficult to apply. Traditional cast alloys have high silicon content. This results in the production of components that are more difficult to anodize and/or conversion coat compared to wrought alloys.

Casting requires expensive upfront tooling costs. Casting dies are expensive to produce, require long lead times to design and manufacture, and need maintenance over their effective lifetimes. Moreover, casting dies are incapable of being used for components of different sizes or lengths. This necessitates that the design and manufacture of different casting dies for each individualized component.

As a result, there is a need for structural components for a marine outboard engine that are not prepared by casting processes or that comprise casting alloys.

SUMMARY OF INVENTION

Disclosed herein are wrought structural components for marine outboard engines. The components comprise a first face, a second face, and a sidewall comprising a first sidewall face and a second sidewall fact extending from the first face to the second face, wherein the component comprises a wrought aluminum alloy and the component is essentially free of draft angles. In certain embodiments, the component is a drive shaft spacer. The components may be prepared by extrusion.

The components may comprise an alloy having a low silicon content, a low copper content, a high plane strain fracture toughness, a high tensile ductility, and/or a low porosity. Examples of wrought aluminum alloys for use in the components are 3000 series wrought aluminum alloys, 5000 series wrought aluminum alloys, or 6000 series wrought aluminum alloys.

Another aspect of the invention is assemblies for marine outboard engines comprising a wrought structural component as described herein welded to a second component with a weld filler, wherein the wrought structural component, the second component and the weld filler have a galvanic potential within about 0.020V of each other. In certain embodiments, the assembly comprises a wrought structural driveshaft spacer welded to a spray play or an anti-ventilation plate.

Another aspect of the invention are driveshaft housings for marine outboard engines configured to accept wrought structural components as described herein of different lengths. In certain embodiments, the wrought structural components are driveshaft spacers of different lengths.

BRIEF DESCRIPTION OF DRAWINGS

The following drawings are meant only to be illustrative and are not meant as limitations on the scope of the invention or of the appended claims.

FIG. 2A shows an exemplary assembly comprising wrought structural component of from a top view.

FIG. 2B shows a side view of the exemplary assembly comprising the wrought structural component of FIG. 2A.

DETAILED DESCRIPTION

Disclosed herein are wrought structural components for a marine outboard engine, assemblies comprising a wrought structural component, and housings configured to accept a wrought structural component. The technology will be described with reference to an exemplary embodiment illustrated in the accompanying drawings.

Wrought structural components of the present technology comprise a first face, a second face, and a sidewall extending from the first face to the second face. The first face and the second face may be substantially parallel with respect to each other. In certain embodiments, the first face and second face are substantially parallel with respect to each other within a tolerance of 3.0°, 2.5°, 2.0°, 1.5°, 1.0°, or 0.5°. The sidewall that extends from the first face and second face may be substantially perpendicular with respect to the first face, the second face, or both the first face and the second face. In certain embodiments, the sidewall that extends from the first face to the second face is substantially perpendicular with respect to the first face, the second face, or both the first face and the second face within a tolerance of 2.0°, 1.5°, 1.0°, or 0.5°. The sidewall may comprise a first sidewall face and a second sidewall face that each extend from the first face to the second face, and a wherein a line tangent to the first sidewall face and a line tangent to the second sidewall face are substantially parallel with each other. In certain embodiments, the line tangent to the first sidewall face and the line tangent to the second sidewall face are substantially parallel with each other within a tolerance of 2.0°, 1.5°, 1.0°, or 0.5°.

The structural component may be prepared by an extrusion process. Processes for extruding alloys for the preparation of components are known in the art, and no particular extrusion process is necessary for obtaining any of the numerous benefits of the technology. For the preparation of aluminum alloy components, the hot, direct extrusion process may be used.

Figure 1:
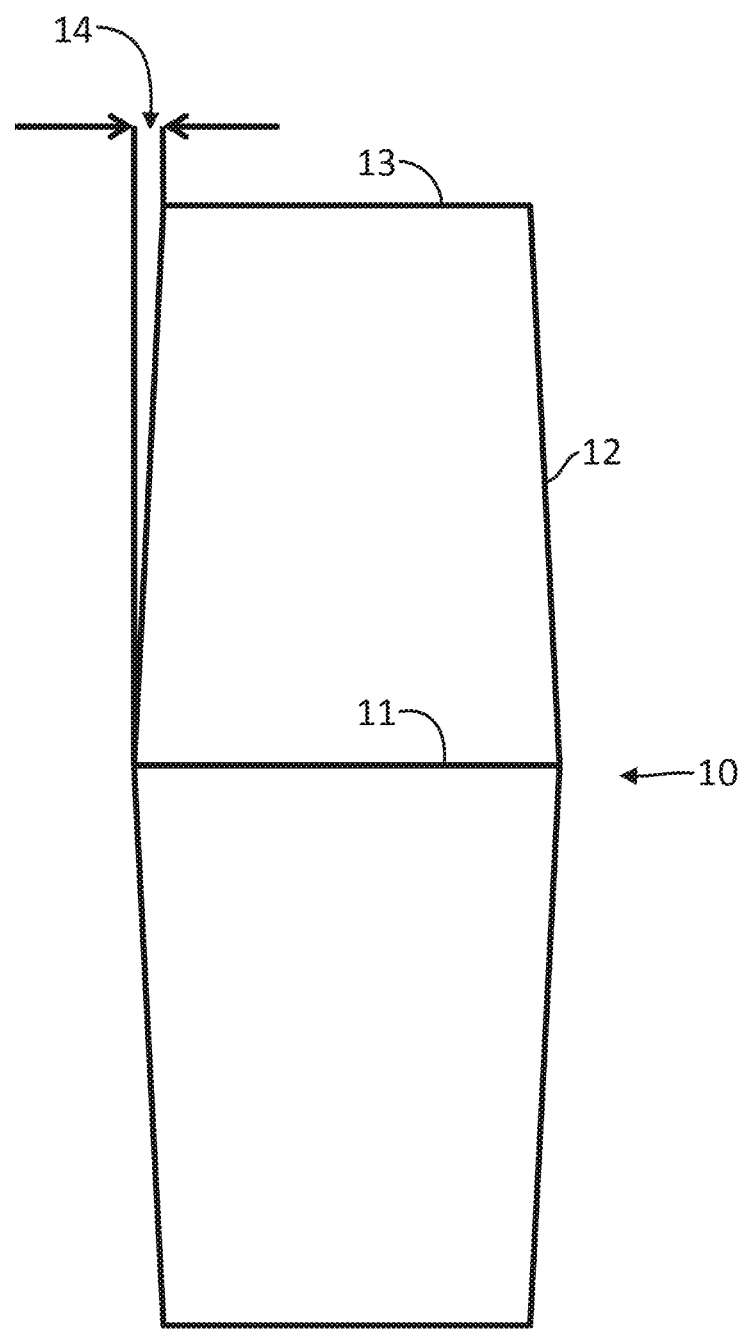
FIG. 1 shows a cross-sectional profile of a cylinder having longitudinal draft.

By using extrusion processes to prepare the structural components as opposed to a casting process, draft angles may be avoided. Referring now to FIG. 1, draft 14 is the amount of taper for molded or cast parts 10 perpendicular to a parting line 11. Draft 14 may be measured by degrees or by dividing the width of the opening by the depth. In the small-angle limit, these two ways of measuring the draft angle are approximately equal. Draft angles are preferably between 2.0° and 3.0°. FIG. 1 shows a cast part 10 comprising cross-sectional cylinder with longitudinal draft 14 from the parting line 11 along the side wall 12 to a face 13. Because of the draft 14, the sidewall 12 and the face 13 deviate from perpendicularity. When draft angles are present in a structural component, there is the necessary introduction of excess metal or alloy into the component. The amount of excess metal or alloy is proportionally higher in the region around the parting line 11 and decreases as one approaches a terminal face, e.g., face 13. This in turn increases the weight of the component. In some embodiments, the weight reduction achievable by manufacturing a component lacking draft angles may be greater than about 5%, greater than about 10%, greater than about 15%, greater than about 20%, greater than about 25%, greater than about 30%, or greater than about 35% when compared to a component having draft angles and similar functional and/or performance characteristics.

An exemplary embodiment of the invention is disclosed in FIGS. 2A-2D for use with a marine outboard motor. More particularly, FIGS. 2A-2D disclose a wrought structural component in the form of a driveshaft spacer 100, the drive shaft spacer comprising a first face 101, a second face 102, the second face 102 substantially parallel with the first face 101, and a sidewall comprising a first sidewall face 105 and a second sidewall face 107 extending from the first face 101 and the second face 102. Because the component is free of draft angles, the component may have sidewall faces 105, 107 that are substantially parallel. As FIGS. 2A-2D illustrate several exemplary tangent lines 111, 112, 113 that are represented with the dashed line. The component may have any number of tangent lines along the outer sidewall, the inner side wall or both. A first tangent line 111 and a second tangent line 112 may both be on an outer sidewall face and be substantially parallel with each other. A first tangent line 111 to an outer sidewall face and a third tangent line 113 to an inner sidewall face may be substantially parallel with each other. One of skill in the art will readily appreciate that there are innumerable tangent to the an outer sidewall or both an outer sidewall and an inner sidewall that may be substantially parallel with each other.

Although FIGS. 2A-2D illustrate a particular embodiment of the invention, other wrought structural components are also within the scope of the invention. In addition to the driveshaft spacer illustrated in FIGS. 2 A-2D, wrought structural components within the scope of the invention include, but are not limited to, exhaust components, other driveshaft components, transom bracket components, swivel bracket components, or gear case components.

The component may be prepared by any suitable wrought aluminum alloy. In certain embodiments, the wrought aluminum alloy may be selected from any of the wrought aluminum alloys described below and/or may have one property, or any combination of the properties described below.

The wrought aluminum alloy may have a low silicon content as measured on a percent weight or any other appropriate basis. Wrought aluminum alloys having a low silicon content allow for improved barrier coatings because the ease of anodizing or conversion coating the surface. In some embodiments, the wrought aluminum alloy may have a silicon content less than about 1.5% wt. In certain embodiments, the wrought aluminum alloy may have a silicon content less than about 1.4% wt, 1.3% wt, 1.2% wt, 1.1% wt, 1.0% wt, 0.9% wt, 0.8% wt, 0.7% wt, 0.6% wt, 0.5% wt, 0.4% wt, 0.3% wt, 0.2% wt, or 0.1% wt.

The wrought aluminum alloy may have a low copper content. In some embodiments, the wrought aluminum alloy may have a copper content less than about 0.6% wt. In certain embodiments, the wrought aluminum alloy may have a copper content less than about 0.5% wt, 0.4% wt, 0.3% wt, 0.2% wt, or 0.1% wt.

The wrought aluminum alloy may have a high plane strain fracture toughness. Wrought aluminum alloys having a high plane strain fraction toughness have improved impact resistance because their ability to resist fracture when a crack is present. In some embodiments, the wrought aluminum alloy may have a plane strain fracture toughness greater than 20 MPa√m. In certain embodiments, the wrought aluminum alloy may have a strain fracture toughness greater than 25 MPa√m or 30 MPa√m.

The wrought aluminum alloy may have a high tensile ductility. Wrought aluminum alloys having a high tensile ductility have improved impact resistance because of their ability to deform under tensile stress. In some embodiments, the wrought aluminum alloy has a tensile ductility greater than about 8% elongation. In certain embodiments, the wrought aluminum alloy has a tensile ductility greater than about 9% or 10% elongation.

The wrought aluminum alloy may have a low porosity. Wrought aluminum alloys having a porosity allow for improved barrier coatings because they require less surface processing. In some embodiments, the wrought aluminum alloy has a porosity less than about 0.10%. In certain embodiments, the wrought aluminum alloy has a porosity less than about 0.09%, 0.08%, 0.7%, 0.06%, or 0.05%.

The wrought aluminum alloy may be alloyed with various principal alloying elements. In certain embodiments, the wrought aluminum alloy may have manganese as its principal alloying element. Wrought aluminum alloys of this type may be designated as a 3000 series alloy as described in the *International Alloy Designations and Chemical Composition Limits for Wrought Aluminum and Wrought Aluminum Alloy* published by the Aluminum Association ("International Alloy Designation System"). In certain embodiments, the wrought aluminum alloy may have magnesium as its principal alloying elements. Wrought aluminum alloys of this type may be designated as a 5000 series alloy under the International Alloy Designation System. In certain embodiments, the wrought aluminum alloy may have magnesium and silicon as its principal alloying elements. Wrought aluminum alloys of this type may be designated as a 6000 series alloy under the International Alloy Designation System. Any of the 3000 series alloys, 5000 series alloys, or 6000 series alloys may be used to prepare a wrought structural component. Of particular utility are the 6000 series alloys due to their high extrusion speed, low cost, good strength to weight ratio, and good corrosion resistance. 6061, 6063, and 6005A are examples of alloys that have particular utility for practicing the invention.

Figure 2C:
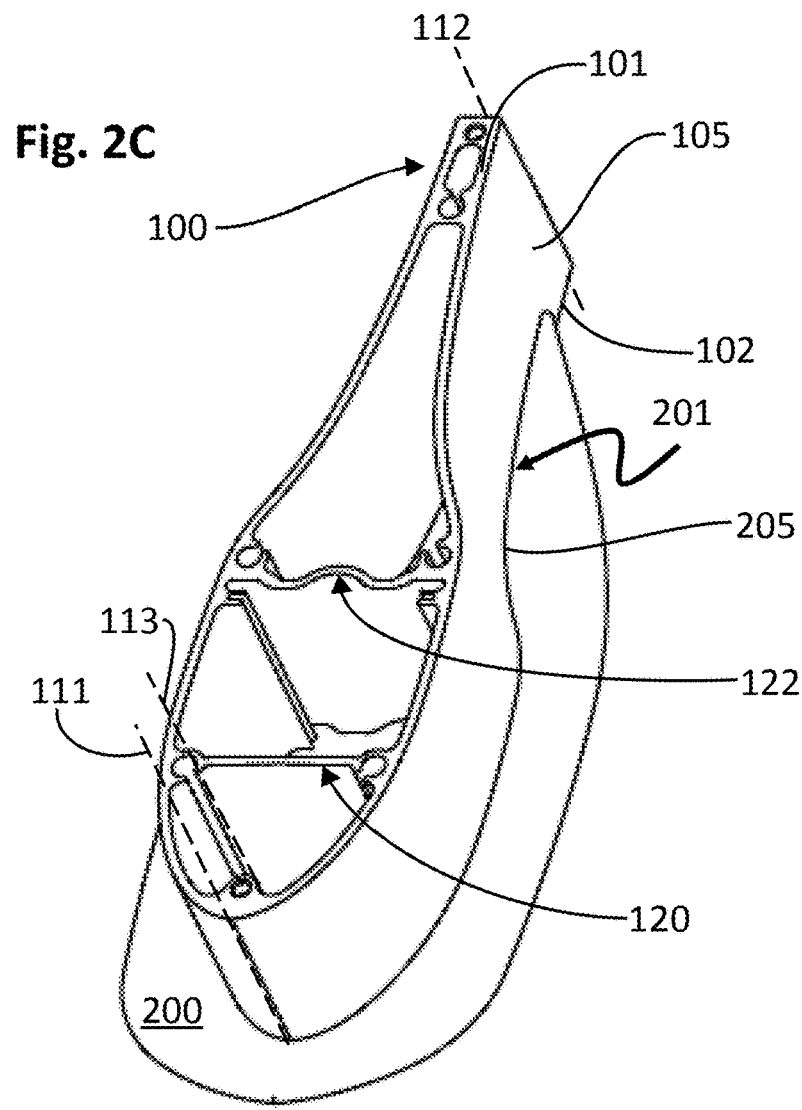
FIG. 2C shows a perspective view of the exemplary assembly comprising the exemplary wrought structural component of FIG. 2A.

As shown in FIGS. 2A and 2C, the wrought structural components e.g. 100 described herein may further comprise geometric features 120, 122 to promote localized plastic deformation and/or buckling in an impact event. The geometric features 120, 122 may comprise any type of structural feature, including, but not limited to ribs, notched ribs, or crush zones.

The wrought structural components eg. 100 may comprise a finish. The finishes may be useful for the prevention of corrosion. In some embodiments, the finish may be a conversion coating, organic coating, or an oxidation coating or any combination of the above. An example of a finish comprising a combination of coatings is a finish comprising a chromate conversion coating, an epoxy coating, and an acrylic coating.

An aspect of the technology is that the components described herein may be part of an assembly. As used herein and as shown by example in FIGS. 2A-2C, an assembly comprises a first wrought structural component 100 joined to a second component 200, where the first wrought structural component 100 comprises a wrought aluminum alloy and is free of draft angles. The first component 100 and the second component 200 may be joined by any suitable means of mechanical assembly, including, but not limited to welding or bolting. In certain embodiments, the second component 200 is also a wrought structural component comprising a wrought aluminum alloy and free of draft angles. In some embodiments, the first component 100 and the second component 200 have a galvanic potential within about 0.020 V of each other. By matching the galvanic potentials of the first component and the second component, one may be able to minimize differential corrosion between components of different alloys. In particular embodiments, the first component and the second component have a galvanic potential within about 0.018 V, about 0.016 V, about 0.014 V, about 0.012 V, about 0.010 V, about 0.008 V, about 0.006 V, about 0.004 V, or about 0.002 V each other. The first component 100 or the second component 200 may comprise any of the alloys described above.

In some embodiments, the assemblies prepared by welding the first component 100 and the second component 200. In particular embodiments, for example as shown in FIG. 2C, the assembly is prepared by welding the first component 100 and the second component 200 with the use of a weld filler 205 along seam 201. In some embodiments, the first component 100, the second component 200, and the weld filler 205 have a galvanic potential within about 0.020 V of each other. By matching the galvanic potentials of the first component 100, the second component 200, and the weld filler 205, one may be able to minimize differential corrosion between components of different alloys. In particular embodiments, the first component 100, the second component 200, and the weld filler 205 have a galvanic potential within about 0.018 V, about 0.016 V, about 0.014 V, 0.012 V, about 0.010 V, about 0.008 V, about 0.006 V, about 0.004 V, or about 0.002 V each other. The first component 100, the second component 200, or the weld filler 205 may comprise any of the alloys described above. Due to the anode cathode ratio of the filler to base material, the weld filler 205 is preferably cathodic to the materials being welded.

The galvanic potential of the first component 100, the second component 200, or the weld filler 205 may be measured with respect to a reference electrode. Electrochemical cells, reference electrodes and methods for determining galvanic potentials are known in the art, and no particular equipment or method of determining galvanic potentials is required. In certain embodiments, the galvanic potential may be determined with respect to an Ag/AgCl reference electrode. For example, a first component comprising wrought aluminum alloy 6063-T5 has a galvanic potential of −0.77 V versus a Ag/AgCl reference electrode, a second component comprising wrought aluminum alloy 5052-H32 or 5052-H34 has a galvanic potential of −0.77 V versus a Ag/AgCl reference electrode, and a weld filler comprising wrought aluminum alloy 4043 has a galvanic potential of −0.77 V versus a Ag/AgCl reference electrode. As a result, the use of wrought aluminum alloy 6063-T5, 5052-H32, and 4043, although all different alloys, allows for the assembly comprising a first component 100, a second component 200, and a weld filler 205 having galvanic potentials within about 0.020 V of each other.

An exemplary assembly of the invention is disclosed in FIGS. 2A-2D for use with a marine outboard motor. More particularly, FIGS. 2A-2D discloses a driveshaft spacer-plate assembly comprising a driveshaft spacer 100, i.e., a first component that has been welded to a spray plate 200, i.e., a second component, along a seam 201 comprising weld filler 205 that joins the driveshaft spacer 100 and the spray plate 200. Although FIGS. 2A-2D illustrates a particular embodiment of the invention, other assemblies are also within the scope of the invention. In addition to the driveshaft spacer-plate assembly illustrated in FIGS. 2A-2D, assemblies within the scope the invention include, but are not limited to, exhaust assemblies, other driveshaft assemblies, transom bracket assemblies, swivel bracket assemblies, or gear case assemblies.

Figure 2D:
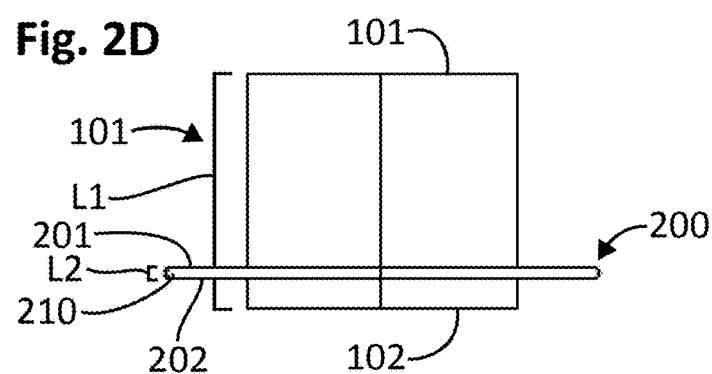
FIG. 2D shows a front view of the exemplary assembly comprising the exemplary wrought structural component of FIG. 2A.
Figure 3:
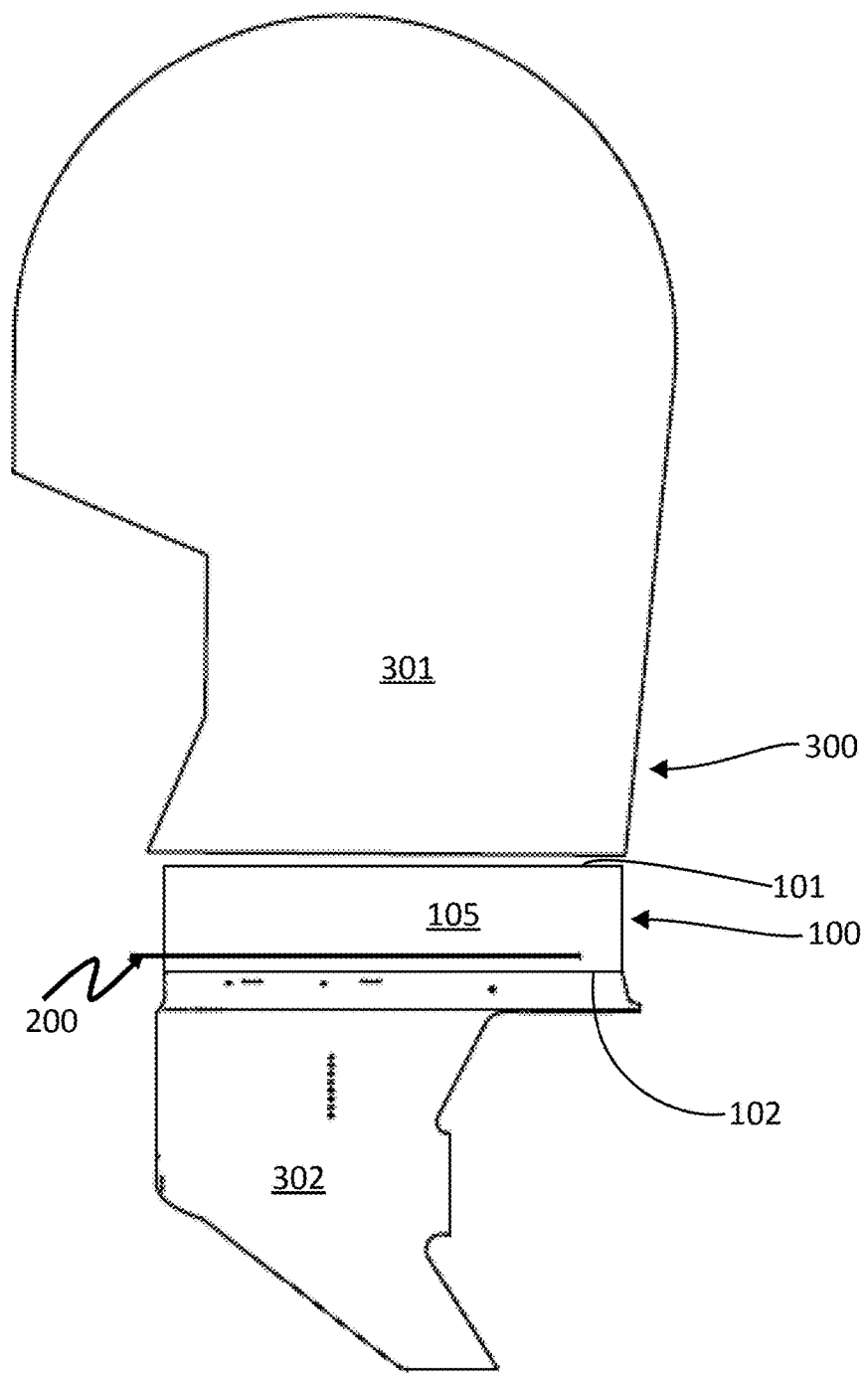
FIG. 3 shows an exemplary marine outboard engine accepting the exemplary assembly comprising the wrought structural component of FIG. 2A.

Referring now to FIG. 3, and with reference to FIG. 2D, another aspect of the technology is a housing e.g. 300 configured to accept a first wrought structural component 100 and a second wrought structural component 200 of different lengths. The first component 100 and the second component 200 may be any of the components described above. The first component 100 may comprise a first face 101, a second face 102 substantially parallel with respect to the first face 101, and a sidewall 105 extending from the first face 101 to the second face 102 having a first length L1. The second component 200 may comprise a first face 201, a second face 202 substantially parallel with respect to the first face 201, and a sidewall 210 extending from the first face 201 to the second face 202 having a second length L2. The first component 100 and the second component 200 differ in that the first length L1 and the second length L2 are different, but each of the first component 100 and second component 200 comprise a wrought aluminum alloy and each of the first component and second component are free of draft angles. When the first component 100 and the second component 200 are prepared by extrusion, the first component 100 and second component 200 may be able to be interchangeably swapped for each other without the need to prepare separate casting dies.

An exemplary housing of the invention is disclosed in FIG. 3 for use with a marine outboard motor. More particularly, FIG. 3 discloses a housing 300 configured to accept an assembly comprising a driveshaft spacer as the first component 100 and a spray plate as the second component 200 welded to the driveshaft spacer. The housing 300 also comprises an engine cover 301 and a gear case 302 suitably connected with the assembly comprising the driveshaft spacer 100 and the sprayplate 200.

Although FIG. 3 illustrates a particular embodiment of the invention, other wrought structural components are also within the scope of the invention. In addition to housing configured to accept a driveshaft spacer as illustrated in FIG. 3, housing within the scope of the invention include, but are not limited to, exhaust housings, driveshaft housings, transom bracket housings, swivel bracket housings, or gear case housings.

The housing 300 configured to accept a first component 100 and a second component 200 may be housing configured to accept a first assembly comprising the first component 100 and a second assembly comprising the second component 200. The first assembly and second assembly may be any of the assemblies described above. In certain embodiments, the assemblies comprise any of the first components 100, second components 200, or weld fillers 205 described above. In particular embodiments, the assemblies comprise a driveshaft spacer 100, either a spray plate 200 or an anti-ventilation plate (not shown), and a weld filler 205.

The present disclosure is not limited to the specific details of construction, arrangement of components, or method steps set forth herein. The components, assemblies, and housings disclosed herein are capable of being made, practiced, used, carried out and/or formed in various ways that will be apparent to one of skill in the art in light of the disclosure that follows. The phraseology and terminology used herein is for the purpose of description only and should not be regarded as limiting to the scope of the claims. Ordinal indicators, such as first, second, and third, as used in the description and the claims to refer to various structures or method steps, are not meant to be construed to indicate any specific structures or steps, or any particular order or configuration to such structures or steps. The use of any and all examples, or exemplary language (e.g., "such as") provided herein, is intended merely to facilitate the disclosure and does not imply any limitation on the scope of the disclosure unless otherwise claimed. No language in the specification, and no structures shown in the drawings, should be construed as indicating that any non-claimed element is essential to the practice of the disclosed subject matter. The use herein of the terms "including," "comprising," or "having," and variations thereof, is meant to encompass the elements listed thereafter and equivalents thereof, as well as additional elements. Embodiments recited as "including," "comprising," or "having" certain elements are also contemplated as "consisting essentially of" and "consisting of" those certain elements.

Recitation of ranges of values herein are merely intended to serve as a shorthand method of referring individually to each separate value falling within the range, unless otherwise indicated herein, and each separate value is incorporated into the specification as if it were individually recited herein. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this disclosure. Use of the word "about" to describe a particular recited amount or range of amounts is meant to indicate that values very near to the recited amount are included in that amount, such as values that could or naturally would be accounted for due to manufacturing tolerances, instrument and human error in forming measurements, and the like.

We claim:

1. A wrought structural component for a marine outboard engine, the component comprising
   (a) a first face,
   (b) a second face substantially parallel with respect to the first face, and
   (c) a sidewall, the sidewall comprising a first sidewall face and a second sidewall face extending from the first face to the second face,
   wherein the component comprises a wrought aluminum alloy and
   wherein the component is essentially free of draft angles.

2. The component of claim 1, wherein a line tangent to the first sidewall face and a line tangent to the second sidewall face are substantially parallel with each other.

3. The component of claim 1, wherein the sidewall and the first face are substantially perpendicular with respect to each other and the sidewall and the second face are substantially perpendicular with respect to each other.

4. The component of claim 1, wherein the component is prepared by extrusion.

5. The component of claim 1, wherein the wrought aluminum alloy has a silicon content less than about 1.5% wt.

6. The component of claim 1, wherein the wrought aluminum alloy has a copper content less than about 0.6% wt.

7. The component of claim 1, wherein the wrought aluminum alloy has a plane strain fracture toughness greater than about 20.0 MPa$\sqrt{}$m.

8. The component of claim 1, wherein the wrought aluminum alloy has a tensile ductility greater than about 8.0% elongation.

9. The component of claim 1, wherein the wrought aluminum alloy has a porosity less than about 0.1%.

10. The component of claim 1, wherein the wrought aluminum alloy is selected from the group consisting of a 3000 series wrought aluminum alloy, a 5000 series wrought aluminum alloy, and a 6000 series wrought aluminum alloy.

11. The component of claim 1, wherein the component has a finish selected from a conversion coating, an organic coating, an oxidation coating, and any combination thereof.

12. The component of claim 1, wherein the component has geometric features to promote localized plastic deformation or buckling in an impact event.

13. An assembly for a marine outboard engine, the assembly component comprising a wrought structural component as in claim 1 welded to a second component with a weld filler, wherein the wrought structural component, the second component and the weld filler have a galvanic potential within about 0.020V of each other.

14. The assembly of claim 13, wherein the first component is a driveshaft spacer and the second component is a spray plate.

15. A driveshaft housing for a marine outboard engine, wherein the driveshaft housing is configured to accept a first wrought structural component and a second wrought structural component,
   wherein the first component comprises
      (a) a first face,
      (b) a second face substantially parallel with respect to the first face, and
      (c) a sidewall extending from the first face to the second face having a first length;

wherein the second component comprises
(a) a first face,
(b) a second face substantially parallel with respect to the first face, and
(c) a sidewall extending from the first face to the second face having a second length;
wherein the first length and the second length are different;
wherein each of the first component and second component comprise a wrought aluminum alloy; and
wherein each of the first component and second component are essentially free of draft angles.

16. The driveshaft housing of claim 15, wherein each of the first component and the second component are driveshaft spacers.

17. The drive shaft housing of claim 15, wherein each of the first component and the second component is part of an assembly.

18. The drive shaft housing of claim 17, wherein the assembly comprising the first component comprises a driveshaft spacer, either a spray plate or an anti-ventilation plate, and a weld filler and the assembly comprising the second component comprises a driveshaft spacer, either a spray plate or an anti-ventilation plate, and a weld filler.

19. The driveshaft housing of claim 15, wherein the first component, the second component, or each of the first component and the second component are prepared by extrusion.

20. The driveshaft housing of claim 15, wherein the wrought aluminum alloy of the first component, the wrought aluminum alloy of the second component, or each of the wrought aluminum alloys of the first component and the second component
(i) has a property selected from the group consisting a silicon content less than about 1.5% wt, a copper content less than about 0.6% wt, a plane strain fracture toughness greater than about 20 MPa√m. a tensile ductility greater than about 8% elongation, a porosity less than about 0.1%, and any combination thereof;
(ii) the wrought aluminum alloy of the first component, the wrought aluminum alloy of the second component, or each of the wrought aluminum alloys of the first component and the second component is selected from the group consisting of a 3000 series wrought aluminum alloy, a 5000 series wrought aluminum alloy, and a 6000 series wrought aluminum alloys; or both (i) and (ii).

* * * * *